United States Patent [19]
Villarroel et al.

[11] 3,756,068
[45] Sept. 4, 1973

[54] CARBON DIOXIDE CONCENTRATION SENSOR

[75] Inventors: Fernando Villarroel, Bowie; James W. Joyce, Jr., Rockville, both of Md.

[73] Assignee: The United States of America as represented by the Secretary of the Army, Washington, D.C.

[22] Filed: Apr. 30, 1971

[21] Appl. No.: 139,072

[52] U.S. Cl. ................................................ 73/23
[51] Int. Cl. ............................................ G01n 1/22
[58] Field of Search ........................... 73/23, 24, 32; 137/81.5

[56] References Cited
UNITED STATES PATENTS

| | | | |
|---|---|---|---|
| 3,273,377 | 9/1966 | Testerman et al. | 73/23.1 |
| 3,165,146 | 1/1965 | Smith et al. | 73/23 X |
| 3,373,600 | 3/1968 | Taplin | 73/32 |
| 3,494,357 | 2/1970 | Kimball | 137/81.5 X |
| 3,500,849 | 3/1970 | McLeod | 137/81.5 |
| 2,955,457 | 10/1960 | Peters | 73/23 |
| 3,593,023 | 7/1971 | Dodson | 73/23 |
| 3,659,590 | 5/1972 | Jones | 73/23 |

OTHER PUBLICATIONS

"Sonic Gas Analyser for Measurement of Carbon Dioxide in Expired Air", The Review of Scientific Instruments, Vol. 28, No. 11, 11/57, pp. 914–915, Author: F. D. Stott.

Akmenkalns et al., "Pneumatic to Electric Transducers", IBM Technical Disclosure Bulletin, Vol. 5, No. 7, 12/62, pp. 14–15.

Primary Examiner—Herbert Goldstein
Attorney—Harry M. Saragovitz, Edward J. Kelly, Herbert Berl and Saul Elbaum

[57] ABSTRACT

A flueric gas analyzer is disclosed which permits continuous determination of the percent concentration of a specific gas relative to a carrier gas and which provides an instantaneous indication of the results of the determination. In the device, the mixed gas to be analyzed is passed through two independent, cooled dehumidifiers into two independent flueric oscillators. The frequencies of the two oscillators are fluerically mixed, and the resulting beat frequency is measured and processed to provide an appropriate readout of the desired percent concentration.

7 Claims, 2 Drawing Figures

INVENTORS
FERNANDO VILLARROEL
JAMES W. JOYCE, JR.

BY

ATTORNEYS HARRY M. SARAGOVITZ
EDWARD J. KELLY
HERBERT BERL
SAUL ELBAUM

CARBON DIOXIDE CONCENTRATION SENSOR

RIGHTS OF GOVERNMENT

The invention described herein may be manufactured, used and licensed by or for the Government of the United States for governmental purposes without the payment to us of any royalty thereon.

BACKGROUND OF THE INVENTION

1. Field of the Invention

This invention relates generally to gas analyzers, and more particularly to flueric gas analyzers.

2. Description of the Prior Art

Devices have been developed in the past which analyze the compositions of unknown gases by measuring various physical properties of the gases. Systems have been developed, for example, which measure the acoustic properties of an unknown gas to determine its molecular weight. However, these systems are normally complicated and expensive in that they require electronic tone generators and input transducers to create appropriate acoustic signals within a body of the unknown gas. In addition to being expensive and complicated to construct, these devices may be of limited accuracy due to the possibility of tone generator drift, and input transducer nonlinearities.

Other devices have been proposed in which fluid feedback oscillators are used in the analysis of gases of unknown concentrations. Such devices have also been found to be expensive and complicated to design and construct for at least two reasons. First, a reliable fluid feedback oscillator is in itself somewhat difficult and expensive to design and to fabricate in a workable form. Second, coupling such oscillators together, which is necessary to provide a comparison between the oscillation frequency of a known carrier gas and that of the unknown gas, is difficult due to the structure and operation of fluid feedback oscillators. Consequently, in the past it has been necessary to use separate fluid feedback oscillators, and equip each with an electronic transducer to detect its oscillation frequency. An expensive electronic mixing device is then required to permit the signals from the separate transducers to be combined in such a way that the difference in their output frequencies may be measured.

In addition, many gas analysis systems developed in the past have relied heavily on electronics and electrical equipment, such as electrical vacuum pumps and the like. This limits the usefulness of such equipment in some environments, such as a pure oxygen atmosphere, where electronic or electrical equipment could cause a fire or an explosion.

Prior gas analysis systems have also been deficient in that they required intermittent sampling of the gas being analyzed, and thus were not capable of continuous analysis. Such systems were also generally incapable of providing an approximately instantaneous readout of the results of their analyses.

SUMMARY OF THE INVENTION

Accordingly, one object of this invention is to provide a novel flueric gas analysis apparatus.

Another object of this invention is to provide a novel system for determining the percent concentration of a particular gas relative to a carrier gas.

A further object of this invention is to provide a system for continuously analyzing a mixed gas and for providing a nearly instantaneous readout of the result of the analysis.

Yet another object of the instant invention is to provide a gas analysis apparatus which is safe to use even in hazardous atmospheres.

A still further object of the present invention is to provide a novel flueric oscillator network for a gas analysis apparatus.

Briefly, these and other objects of the invention are achieved by passing a stream of a known carrier gas and a stream of the carrier gas combined with an unknown concentration of another gas through separate dehumidifiers. From the dehumidifiers, the gas streams are fed to separate dehumidifiers.

A beat frequency oscillation occurs in the sonic transmission line which is appropriately processed to provide an indication of the unknown gas concentration.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
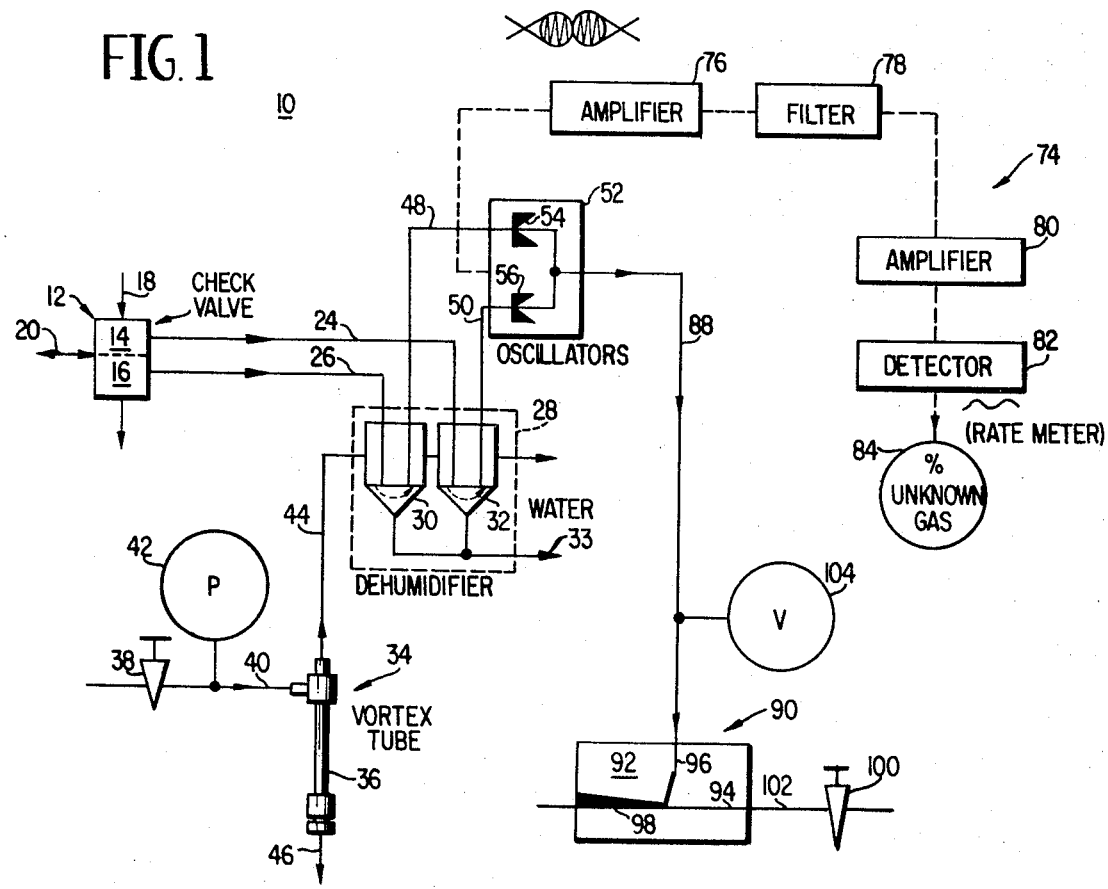
FIG. 1 is a schematic illustration of the gas anaylsis apparatus of the present invention.

Referring now to the drawings wherein like reference numerals designate identical or corresponding parts throughout the several views, and more particularly to FIG. 1 thereof, the instant invention is shown as comprising a flueric gas analysis apparatus indicated generally by the reference numeral 10.

Before completing the description of the apparatus of FIG. 1, it should be noted that the word "flueric" is a known word of art which specifically refers to a purely fluid element, that is, one having no moving parts and thus no chance for breakdown or failure. In contradistinction, the words "fluidic" or "fluid" are much broader than the term "flueric" and are known in the art to refer to any type of fluid element, such as those having diaphragms, pistons and similar moving parts. These known definitions of the words "fluid," "fluidic" and "flueric" are further exemplified by reference to the *Military Standard Fluidics Terminology and Symbols Textbook*, dated July 17, 1968, and generally referred to as "MIL-STD-1306." This document is an official Department of Defense publication.

The input to the system of FIG. 1 occurs through a check valve 12 which may include, for example, an input chamber 14 and an exhaust chamber 16. A known carrier gas is supplied to the input chamber 14 through a gas line 18, and is then withdrawn from the input chamber 14 through a line 20 to be used or processed. The used or processed gas is then returned over line 20 to an exhaust chamber 16 where it is exhausted through a line 22. This system may be useful in a medical environment, for example, as well as in a wide variety of other environments. If used in a medical environment, the input or carrier gas may be oxygen or a combination of nitrogen and oxygen, for example. The processing or use line 20 may be coupled to a breathing mask where a patient breathes the incoming carrier gas. The patient then exhales the carrier gas combined with an unknown percentage of carbon dioxide ($CO_2$) into the exhaust chamber 16 of check valve 12. If used in this way, the system of the present invention can detect a carbon dioxide concentration of from 0 to 10 percent in air, oxygen or any combination of nitrogen and oxygen. Of course, the system can be used with many other combinations of gases. The system is designed to sample input and output gases (inhaled and exhaled gases, for example) at atmospheric pressure to avoid the possibility of introducing errors into the final measurement due to spurious pressure variations. In addition the system is designed so that variations in the temperature of the gas being analyzed will have a minimal effect on the calibration of the system.

Gas from both the input chamber 14 and the exhaust chamber 16 of check valve 12 is continuously drawn into two sampling lines 24 and 26, respectively by a vacuum system which will be described hereinafter. The rate at which gas is withdrawn over each of the sampling lines may be on the order of 1cc/sec., for example.

The continuously sampled gas is then passed through a dehumidifier 28, where it is cooled and where excessive moisture is removed from it. Although any type of dehumidifier may be used, two conventional independent flueric dehumidifiers 30 and 32 are preferred. These dehumidifiers have no moving parts, require no use of electrical energy, and are non-chemical, thus preventing the gases being analyzed from being contaminated in any way. A drain 33 is coupled to both of the flueric dehumidifier units 30 and 32 to permit disposal of excess moisture or water which is separated from the gases being analyzed.

Dehumidifier 28 is cooled by a suitable refrigeration system 34. Refrigeration system 34 may be any conventional refrigeration system, although, again, a flueric system, employing a vortex tube 36, for example, is preferred. The vortex tube 36 provides sufficient cooling capacity without requiring mechanical refrigeration pumps, electric pump motors and the like. In addition the vortex tube is compact, convenient to use in a confined space and safe in a hazardous atmosphere. In operation, air at room temperature (70° F, for example) is supplied to vortex tube 36 through a valve 38 and an air line 40. A pressure gauge 42 may be coupled to air line 40 to permit control of the input air pressure. The air in line 40 may be at 30p.s.i.g. and flowing at a rate of 20L.p.m., for example. The input air is then processed in the vortex tube and cooled air (at 35° F, for example) is fed to dehumidifier 28 to cool flueric dehumidifier units 30 and 32. Hot air (at about 150° F, for example) is exhausted from the lower end of the vortex tube 36 over a hot air exhaust line 46.

Figure 2:
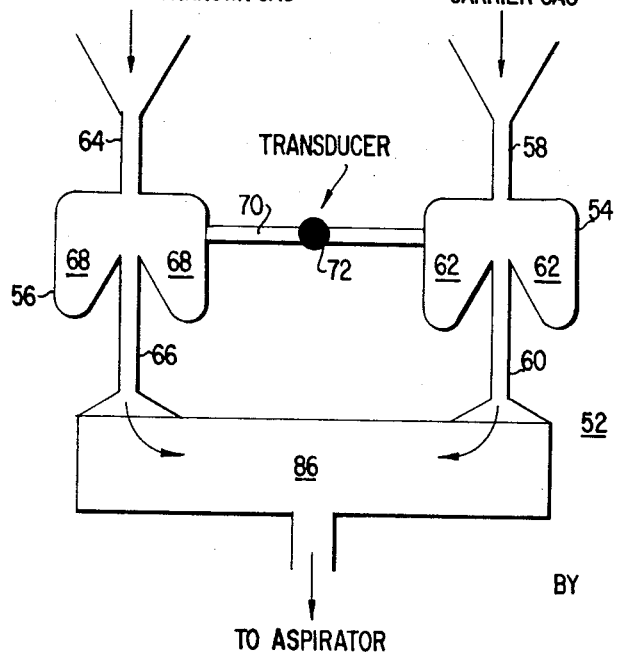
FIG. 2 is a schematic illustration more clearly showing the flueric oscillator structure used in the gas analysis apparatus of FIG. 1.

The dehumidified gases from flueric dehumidifier units 30 and 32 are respectively withdrawn from these units over lines 48 and 50 and applied to a flueric oscillator network 52, which is shown in greater detail in FIG. 2.

Referring now to FIG. 2, oscillator network 52 is shown as including two flueric oscillators 54 and 56 of substantially identical configuration. Flueric oscillator 54 includes an input passage 58, an output passage 60 and two essentially identical oscillating chambers 62 of generally triangular configuration. Similarly, flueric oscillator 56 includes an input passage 64, an output passage 66 and two oscillating chambers 68 of generally triangular configuration.

Both oscillators 54 and 56 are of essentially the same size, and therefore oscillate at essentially the same frequency. However, it has been found that the system yields best results if one of the flueric oscillators, for example the oscillator to which the pure carrier gas is fed, is slightly smaller than the other oscillator and therefore oscillates at a slightly higher frequency. It has been found that an oscillating frequency on the order of 33,000 cps is appropriate for the flueric oscillators 54 and 56. Since the theory of operation of flueric oscillators is generally well known to those skilled in the art, it is not believed necessary to describe it in detail here. Suffice it to say, that as gas is introduced into each of the flueric oscillators 54 and 56, oscillations spontaneously occur due to the structure and configuration of the oscillating chambers 62 and 68. As is also well known to those skilled in the art, the frequencies of these oscillations are proportional to the speed of sound in the gases introduced into the flueric oscillators. Thus, by knowing the composition of the carrier gas and by knowing the composition of the unknown gas the concentration of which is to be measured, the percent concentration of the unknown gas can be calculated from the difference in the oscillation frequencies of the two flueric oscillators.

Oscillators 54 and 56 are fluerically coupled by means of a sonic transmission line 70. The transmission line 70 may consist of a tube having a small aperture at either end communicating with the oscillating chambers 62 and 68 or flueric oscillators 54 and 56 respectively. The apertures in either end of sonic transmission line 70 must be made small enough to provide flow resistance sufficient to keep flueric oscillators 54 and 56 isolated from one another and thus sufficient to permit them to function independently. On the other hand, the transmission line 70 must be so constructed that the sonic oscillations from the two flueric oscillators will be able to be propagated within it. At the center of the transmission line 70 a pressure transducer 72 is provided. This transducer may, for example, be a conventional transistor pressure transducer such as the type sold under the trade name "Pitran." It is important to note that this single transducer senses the combined oscillations of both flueric oscillators 54 and 56, which are fluerically coupled through transmission line 70. Flueric oscillators 54 and 56 oscillate at different frequencies due to the fact that different combinations of gas are being introduced into each of them. This difference in oscillating frequencies appears within transmission line 70 as a beat frequency modulation of a relatively high frequency carrier wave. Thus, the output of transducer 72 is a high frequency carrier wave modulated by a beat frequency, which contains the desired information as to the percent concentration of the unknown gas.

The output of transducer 72 is fed to a signal processing system 74. This system, which may take many forms, may consist of a first amplifier 76 coupled to a filter 78, which is in turn coupled to a second amplifier 80. The amplifier 80 is coupled to a detector 82 which drives a rate meter 84, providing a direct indication of the percent concentration of the unknown gas. The components of the signal processing system can be varied, of course. For example, rate meter 84 may be replaced by a chart recorder to obtain a permanent record of the system's output. This signal processing network effectively separates the beat frequency modulation from the high frequency carrier wave, analyzes the beat frequency information, and calculates the desired output information from it. It should be noted that although the signal processing system shown may be an electronic system, a completely flueric signal analysis network may also be used. However, if a completely flueric signal analysis network is used, the transducer 72 can be eliminated, since the signal existing in transmission line 70 would then be analyzed directly.

The output lines 60 and 66 from flueric oscillators 54 and 56, respectively, are both coupled to a single oscillator exhaust chamber 86. The use of a single exhaust chamber for both oscillators is useful in that it permits the same rate of flow to be maintained through both oscillators.

Referring again to FIG. 1, oscillator exhaust chamber 86 is coupled to a suitable vacuum source 90 through an exhaust line 88. The vacuum source 90 may be any conventional vacuum source, although a flueric aspirator 92 is preferred. The flueric aspirator has no moving parts and requires no mechanical vacuum pump, electric drive motor or any such mechanical components. It is therefore virtually noiseless, compact, vibration free, and suitable for use even in hazardous atmospheres. Aspirator 92, which is a flueric device, includes an air pressure input line 94, an exhaust aperture 98 and a vacuum line 96 coupled to exhaust aperture 98 at its juncture with input line 94. In operation, air is supplied through a valve 100 and a line 102 to the air pressure input line 94 of aspirator 92. The aspirator 92 is structured such that the size of air pressure input line 94 is substantially smaller than that of exhaust aperture 98. Thus, as air rushes from the air pressure input line 94 to the exhaust aperture 98, a substantial pressure drop is created, providing a suction or vacuum in line 96. This vacuum provides a force for drawing the gas to be analyzed from check valve 12 through the entire system until it is exhausted through exhaust aperture 98. A vacuum gauge 104 is provided to permit regulation of gas flow through the analyzer system. In operation, if air at 6p.s.i.g is applied to line 102 at a rate of 5L.p.m., a vacuum of 1p.s.i. is established in line 88, and throughout the system.

In its preferred embodiment, the flueric gas analysis apparatus of the present invention consists entirely of flueric units. Thus, in its preferred embodiment, the present invention comprises a gas analysis system that is compact, noiseless, vibration free and safe to use even in hazardous atmospheres.

It should be understood that the invention is not limited to the exact instructions shown and described herein for obvious modifications will occur to persons skilled in the art.

We claim:

1. A gas analyzer comprising:
sampling means for sampling a carrier gas and for sampling a mixture of said carrier gas with an unknown concentration of another gas;
dehumidifying means coupled to said sampling means for removing excess moisture from said sampled gases;
vortex tube means coupled to said dehumidifying means for cooling said sampled gases passing through said dehumidifying means;
flueric oscillator means coupled to said dehumidifying means for developing a signal representative of said unknown concentration; and,
flueric aspirator means coupled to said flueric oscillator means for drawing said sampled gases through said gas analyzer apparatus; and,
flueric signal processing means for processing said signal representative of said unknown concentration.

2. A gas analyzer as in claim 1, wherein:
said dehumidifying means comprises two independent flueric dehumidifier units.

3. A gas analyzer as in claim 1, wherein:
said flueric oscillator means comprises two substantially identical flueric oscillators.

4. A gas analyzer as in claim 3, wherein:
said two substantially identical flueric oscillators are coupled together by a sonic transmission line.

5. A gas analyzer as in claim 4, wherein:
a flueric signal processing system is coupled to said sonic transmission line.

6. A gas analyzer as in claim 4, wherein:
a pressure transducer is mounted in said sonic transmission line.

7. A gas analyzer as in claim 6, wherein:
an electronic signal processing network is coupled to said pressure transducer.

* * * * *